May 20, 1969  H. P. DOETSCH  3,444,830
ADJUSTABLE GAS SPRING SUPPORTED DRAWING TABLE
Filed Dec. 12, 1966

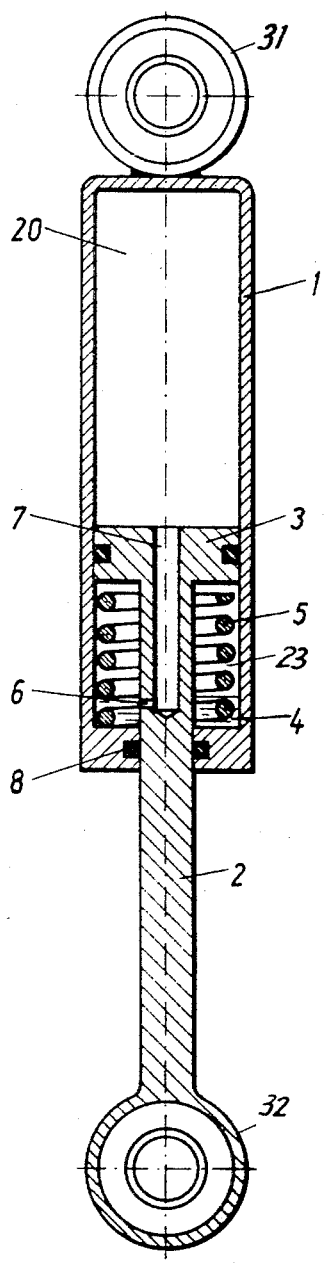
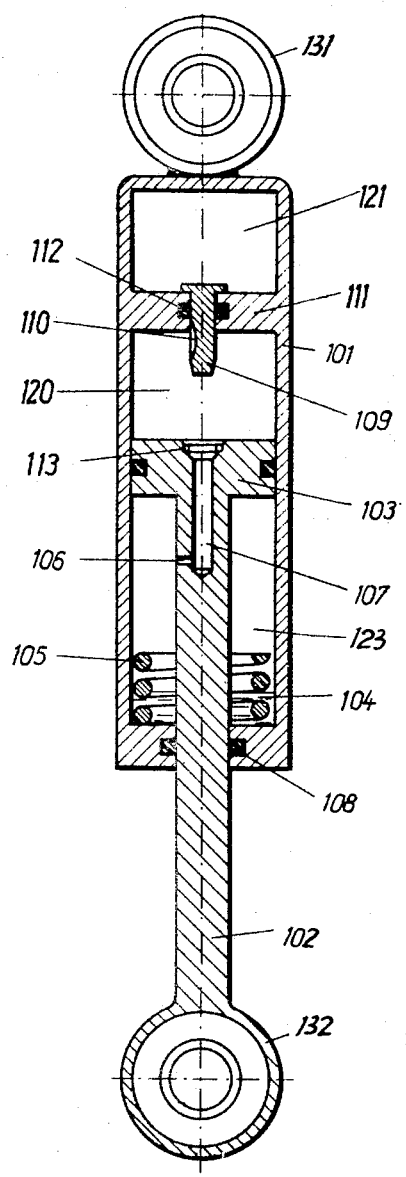

Inventor:
H. P. Doetsch
Low and Berman
Agents

United States Patent Office 3,444,830
Patented May 20, 1969

3,444,830
ADJUSTABLE GAS SPRING SUPPORTED DRAWING TABLE
Hans Peter Doetsch, Altdrossenfeld, Germany, assignor to Stabilus Industrie-und Handelsgesellschaft m.b.H., Koblenz-Neuendorf, Germany
Filed Dec. 12, 1966, Ser. No. 601,153
Claims priority, application Germany, Dec. 10, 1965, N 18,198; Apr. 27, 1966, St 25,286
Int. Cl. A47b 9/02; F16f 13/00, 9/02
U.S. Cl. 108—136
11 Claims

ABSTRACT OF THE DISCLOSURE

A gas spring for a drawing table which has a cylinder, a piston in the cylinder, and a piston rod projecting from the piston through one end wall of the cylinder, the other end wall being imperforate. Gas under pressure fills the cylinder and may be released from the chamber adjacent the piston rod if the latter is almost fully expelled from the cylinder against a compression spring through a channel having orifices in the piston and in the piston rod. Additional gas is admitted to the cylinder of a modified spring when the piston rod is almost fully retracted into the cylinder and the piston strikes a normally closed valve separating the cylinder cavity from a storage chamber.

---

The present invention relates to a weight-compensating and equilibrium-maintaining device, and it is the principal object of this invention to provide a very simple and inexpensive device in the form of a so-called gas spring for compensating the weight or maintaining the equilibrium of any device or apparatus which is adjustable to different levels or inclinations and for permitting such adjustments to be carried out with the least possible physical effort. Among the numerous types of devices and apparatus to which the present invention may be applied may be mentioned especially: drawing tables, X-ray apparatus, hair driers, tilting doors and windows, covers for large freezer chests, and so forth.

In connection with such devices or apparatus it is conventional to balance their weight or to maintain their equilibrium by the provision of counterweights or coil springs. The employment of counterweights has the disadvantage that they require considerable space and also considerably increase the weight of the entire apparatus. The use of coil springs, on the other hand, has the disadvantage that the operations of compressing or expanding such springs require a considerable force and either require or result in considerable changes in force which have to be compensated by special mechanical means such as levers, cams, or other force-transmitting means which considerably increase the cost of the respective apparatus.

Another device which has previously been employed for the above-mentioned purposes is a so-called gas spring which consists of a pneumatic cylinder and piston unit in which the cylinder is filled with a pressure gas, for example, compressed air. Although very successful when specially designed for a specific apparatus, these gas springs have the disadvantage that each of them has a very particular spring characteristic and that therefore a large number of different gas springs have to be produced and be held available for compensating the different forces of different devices or apparatus and even for compensating differences in force which might be due to inaccuracies of manufacture of an individual apparatus of a series thereof. When such gas springs are to be installed, for example, on a drawing table, it is evident that different gas springs would be required either for merely balancing the weight of the drawing board itself or for also balancing the additional weight of a drawing mechanism and/or of a lamp or other implements which are to be connected to the drawing board.

As previously stated, it is therefore the principal object of the invention to provide a gas spring which is adjustable so as to permit it to be installed in different apparatus in which different forces are to be compensated or in one apparatus or a series of apparatus of the same type on which additional elements might be subsequently installed. The gas spring according to the invention may therefore be mass-produced with the result that the cost of each individual spring will be much lower than the cost of one of a large series of nonadjustable gas springs which have to be of many different designs or dimensions.

The adjustable gas spring according to the invention essentially consists of a cylinder in which a piston on one end of a piston rod is slidable, a gas filling this cylinder at a pressure at least as high as that which may be required for compensating the maximum force which might be exerted upon this gas spring in different apparatus or in one apparatus in which the force to be balanced might be subsequently increased, for example, by the installation of additional elements and at least one very simple and inexpensive valve for permitting the gas pressure in the cylinder to be varied.

According to one embodiment of the invention, this valve may be opened by a simple manipulation of the gas spring prior to or during its final installation on a particular apparatus so as to bleed a part of the pressure gas which is continued in the cylinder into the atmosphere until the gas pressure remaining in the cylinder conforms with the medium force which is to be compensated. This valve may simply consist of a choke bore which extends through the piston and the adjacent end of the piston rod and is adapted to connect the inside of the cylinder with the atmosphere when the piston rod is temporarily pulled outwardly from the cylinder for a distance beyond the normal maximum stroke of the piston. Although other means may be provided for preventing the piston rod and piston from being pulled outwardly excessively after the gas pressure within the cylinder has been properly adjusted, it is another feature of the invention to provide a coil spring of a certain length which is interposed between the piston and the bottom end of the cylinder and has a strength greater than that which might possibly occur in the manipulation of the respective apparatus or device to which the gas spring is connected. When the piston rod is pulled outwardly of the cylinder beyond the length of its normal maximum stroke, the piston will press against this coil spring, and it is then necessary to employ a considerable force in order to pull the piston rod further outwardly to such an extent that the lower opening of the bore in the piston rod will communicate with the atmosphere and a part of the pressure gas may thus be bled from the cylinder.

According to another feature of the invention, the gas spring may be provided not only with a valve which permits the gas pressure within the cylinder to be reduced but also with very simple means for permitting this gas pressure to be increased after it has once been adjusted in accordance with the force to be compensated. The gas spring according to the invention is for this purpose provided with an additional chamber in which a gas of a very high pressure is stored, and with a second control or high-pressure valve in the partition which separates the cylinder from this storage chamber. This second valve forms a check valve which is normally closed under the higher pressure of the gas within the storage chamber and which is adapted to be opened by being engaged by the piston when the latter is moved into the cylinder beyond its farthest normal inward stroke as determined by the movements of the apparatus or device the forces of which are to be compensated. According to another feature of the invention, this second control valve may consist of a simple slide valve in the form of a stem which extends through a bore in the partition dividing the cylinder from the storage chamber and has a sealing flange on its end which is located within the storage chamber, and which is further provided with a longitudinal groove near its other end which, when the piston presses the valve stem into the storage chamber, bridges the partition so that the pressure gas with the higher pressure can flow from the storage chamber into the cylinder and increase the pressure therein in accordance with an additional force or weight to be balanced. For insuring that this high pressure will only pass into the working chamber of the cylinder at the side of the piston facing the partition and the second valve therein, and for preventing this pressure from also passing into the other working chamber of the cylinder at the other side of the piston, the bore in the piston and piston rod which, when the piston rod is sufficiently withdrawn, forms a bleed valve as previously described, the end of the high-pressure valve facing the piston may be made of a conical shape and the end of the bore in the piston may form a valve seat for receiving the conical end of this valve and for thus closing the bore which leads to the working chamber at the other side of the piston. Of course, instead of such a valve seat, it is also possible to provide the end of the valve stem which extends into the cylinder with a gasket which is adapted to close the end of the bore in the piston.

According to another modification of the invention, the gas spring may be designed so as to permit its spring characteristic to be varied as often as may be desired. The storage chamber for the high gas pressure may for this purpose consist of a container which extends coaxially to the cylinder and a part of which surrounds the cylinder, and the working chamber of the cylinder through which the piston rod extends may be connected at a point near the cylinder bottom with this storage chamber by means of a simple check valve. The choke bore in the piston does in this case not also extend into the piston rod so as to lead to the atmosphere when the piston is sufficiently withdrawn from the cylinder, but it only extends through the piston and leads from one working chamber of the cylinder to the other. As in the two other embodiments of the invention as previously described, the working chamber of the cylinder through which the piston rod extends also contains a strong coil spring which in this case carries a gasket which forms another valve which is adapted to close the choke bore in the piston when the piston is sufficiently retracted. When the piston is further retracted against the action of the coil spring, the gas which is then sealed in the working chamber which contains the coil spring is pumped out of this chamber into the storage chamber through the above-mentioned check valve near the cylinder bottom. The highly compressed air in the storage chamber may therefore travel in a complete circuit by passing into the first-working chamber of the cylinder when the pressure in the latter should be increased so as to compensate a very strong force, for example, a very heavy weight, and by being pumped out of this working chamber and through the second working chamber back into the storage chamber when the pressure in the first working chamber is to be reduced.

The features and advantages of the present invention will become more clearly apparent from the following detailed description thereof which is to be read with reference to the accompanying drawings, in which:

FIGURE 1 shows a longitudinal section of a gas spring according to the invention, in which the piston and piston rod are provided with bores through which a part of the gas pressure in the cylinder may be released to the atmosphere;

FIGURE 2 shows a longitudinal section of a gas spring according to a modification of the invention, in which the gas pressure in the cylinder may also be increased by the additional provision of a high-pressure storage chamber above the cylinder;

FIGURE 3 shows a longitudinal section of a gas spring according to a further modification of the invention, in which the storage chamber surrounds the cylinder, while

Figure 3:
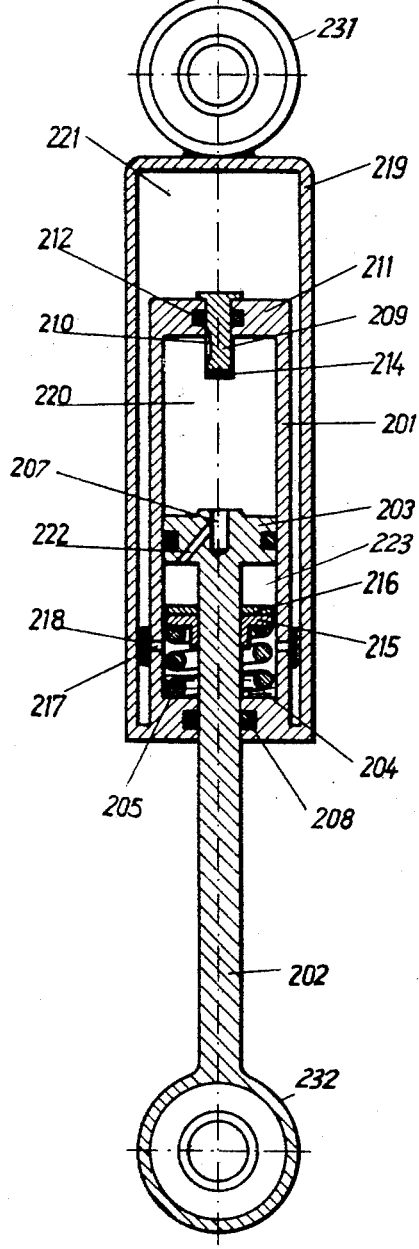

The gas spring according to the invention, as illustrated in FIGURE 1 consists of a cylinder 1 and a piston 3 which is secured to the end of a piston rod 2 and is slidable within the cylinder. Piston 3 divides the interior of cylinder 1 into two chambers 20 and 23 which communicate with each other through a longitudinal bore 7 in piston 3 and piston rod 2 and a transverse choke or throttling bore 6 in piston rod 2. The effective area of the piston face in the chamber 20 is greater than that of the face in the chamber 23 because of the presence of the rod 2 in the latter. A gasket 8 in the bottom of cylinder 1 through which the piston rod 2 extends seals the chamber 23 tightly toward the outside. Chamber 23 contains a coil spring 5 which may rest loosely on the bottom of the cylinder, while chamber 20 is filled with a pressure gas. The axial length of the coil spring 5 in the relaxed condition illustrated in FIG. 1 is such that it does not significantly impede movement of the piston 3 toward the fixed end wall of the cylinder 1 in the chamber 23 as long as the orifice of the throttling bore 6 communicates with the chamber 23, but is substantially greater than that spacing when the orifice is outside the chamber 23 to permit bleeding of gas from the chamber. The outer ends of cylinder 1 and piston rod 2 carry connecting eyes 31 and 32 for mounting the gas spring on another apparatus.

The mode of operation of the gas spring according to FIGURE 1 is as follows: During the assembly of the gas spring, chamber 20 is filled with a gas the pressure of which is made at least equal to the maximum force which might have to be compensated in any of a series of different apparatus or parts thereof to which the gas spring might be connected. After the gas spring has been installed in the particular apparatus, the gas pressure in chamber 20 is reduced until the force which is exerted upon cylinder 1 or piston rod 2 is compensated. This may be done by withdrawing the piston rod 2 against the action of coil spring 5 to such an extent from cylinder 1 that the choke bore 6 in piston rod 2 is moved at least past the gasket 8 toward the outside of cylinder 1 so that some of the pressure gas can escape from chamber 20 to the atmosphere through the bores 7 and 6. This operation may be carried out repeatedly until cylinder 1 contains the proper pressure for compensating the force to which the gas spring is subjected. Piston 3 may then move within the area of cylinder 1 above coil spring 5 in accordance with the relative movements of the parts to which the gas spring is connected by its connecting eyes 31 and 32, and these movements will then be damped due to the fact that at the resulting axial movements of piston rod 2 and piston 3 relative to cylinder 1, the pressure gas must pass from chamber 20 to chamber 23 or vice versa through the transverse choke bore 6. For improving the sealing action of gasket 8 a small amount of oil 4 may be filled into chamber 23. This also has the additional advantage that the wall of the bore in the bottom of cylinder 1 will be lubricated so that the friction of piston rod 2 during its axial movement through this bore will be considerably reduced.

Figure 4:
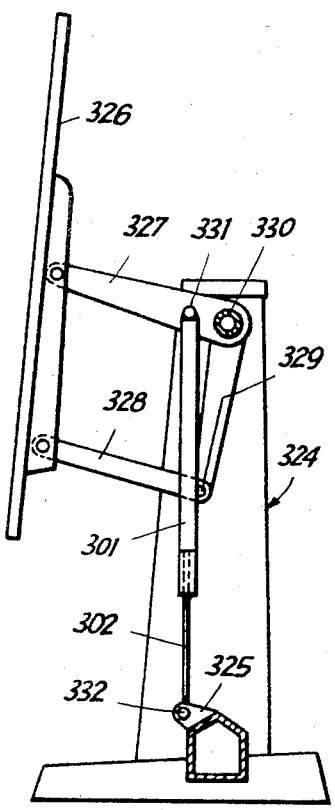
FIGURE 4 shows a side view of a drawing table to which one of the gas springs according to FIGURES 1 to 3 is connected for balancing the weight of the drawing board.

FIGURES 2 and 3 illustrate two modifications of the gas spring according to the invention, while FIGURE 4 illustrates the application of one of the gas springs according to FIGURES 1 to 3 to a drawing table. Those parts of these gas springs which are functionally similar to the parts which have already been described with reference to FIGURE 1 are designated in FIGURES 2, 3 and 4 by the same reference numerals as used in FIG- URE 1, except that these numerals are increased by 100, 200, or 300, respectively.

The gas spring as illustrated in FIGURE 2 differs from that according to FIGURE 1 by the provision of an additional chamber 121 in cylinder 101 which serves as a storage chamber for holding a supply of gas under a high pressure which is filled into this chamber during the manufacture of the gas spring. This storage chamber 121 is separated from the working chamber 120 by a partition 111 with a central axial bore into which a valve is inserted which essentially consists of a valve stem 109 which has a sealing flange on its upper end and a control groove 110 in its outer surface near its lower end. A gasket 112 in the partition 111 and around valve stem 109 normally seals the two chambers 120 and 121 relative to each other. The end of valve stem 109 facing the piston 103 is made of a conical shape, while the upper end of the longitudinal bore 107 in piston 103 is enlarged and contains a gasket 113 which serves as a valve seat for the conical end of valve stem 109.

The mode of operation of the gas spring according to FIGURE 2 differs from that according to FIGURE 1 insofar as it permits the pressure in the working chamber 120 to be increased, and thus the characteristic of the gas spring to be modified. This occurs when during the operation of the apparatus to which this gas spring is connected such a pressure is exerted upon the gas spring that the piston rod 102 will be moved beyond a certain distance into cylinder 101 so that the conical end of valve stem 109 will engage upon the gasket 113 and the valve stem will be pushed upwardly until the control groove 110 bridges the gasket 112 and thus permits a part of the highly compressed gas which is contained in the storage chamber 121 to flow from the latter through the control groove 110 into the working chamber 120 and increase the pressure therein without also flowing into the chamber 122 since the longitudinal bore 107 in piston 103 and piston rod 102 is at this time closed by the engagement of the conical end of the valve stem 109 upon the gasket 113. This will prevent the supply of highly compressed gas in storage chamber 121 from being used up too quickly in the event that the apparatus to which the gas spring is connected is improperly operated. The working chamber 120 would otherwise be supplied with a gas pressure higher than necessary for balancing the force which is exerted upon the gas spring and this gas would then be wasted as it would have to be released to the atmosphere in the same manner as described with reference to FIGURE 1.

In the gas spring as illustrated in FIGURE 3, the cylinder 201 is surrounded by a container 219 which is spaced from the cylinder and forms the storage chamber 221. The connection between the storage chamber 221 and the working chamber 220 again occurs through a valve which is actuated by the piston rod 202 and the valve stem 209 of which is provided with a gasket 214 on its lower end. Near its bottom end, cylinder 201 is provided with a check valve which consists of one or more apertures 217 and a valve ring 218 on the outer wall of the cylinder and surrounding these apertures. On its upper end, coil spring 205 acts upon a spring guide 215 which is slidable on piston rod 202 and carries a gasket 216. The working chamber 223 underneath piston 203 communicates with the upper working chamber 220 through one or more choke bores 222 which extend at an oblique angle to the piston axis and terminate into the longitudinal bore 207.

The pressure in cylinder 201 and thus the spring constant of the gas spring according to FIGURE 3 may be increased in the same manner as described with reference to the gas spring according to FIGURE 2. For lowering the spring constant, piston rod 202 may be moved beyond its normal operating range toward the bottom of cylinder 201 so that at first the gasket 216 on spring guide 215 will close the inclined choke bores 222. When piston rod 202 is moved further toward the bottom of cylinder 201 and piston 203 compresses the coil spring 205, the pressure gas which is then sealed within chamber 223 will be pumped into the storage chamber 221 through the apertures 217 and the valve ring 218 which acts as a check valve. This pumping step may be repeated until the force of the gas spring has been reduced sufficiently so as to compensate the force of the adjustable part, for example, the weight of a drawing table.

FIGURE 4 illustrates the application of one of the gas springs according to FIGURES 1 to 3 to a drawing table which comprises a frame 324 on which a drawing board 326 is mounted so as to permit the same to be raised and lowered to different levels. For simplicity's sake it is assumed that the drawing board 326 is not pivotable to different inclinations but that it remains at the same inclination at any level to which it is adjusted. For such adjustments, the drawing board 326 is provided near each vertically extending side thereof with a pair of arms 327 and 328 which are pivotably connected to the frame 324 by the pivots 329 and 330 and together with the frame and the drawing board form a parallelogram. For locking the drawing board in a fixed position at any level to which it is adjusted, suitable locking means, not shown, may be provided which may act, for example, upon the pivot 330 of the upper lever 327. For compensating the weight of the drawing board 326 at any level thereof, the connecting eye 331 on the upper end of cylinder 301 of the gas spring is pivotably connected to the upper arm 327 at a suitable distance from the pivot 330, while the connecting eye 332 on the lower end of piston rod 302 is pivotably connected to the base 325 of the frame 324 so that the entire gas spring extends in a substantially vertical direction.

The gas spring 301, 302 may be either of the simple type as described with reference to FIGURE 1 or of either construction as described with reference to FIGURE 2 or FIGURE 3. Its details therefore do not need to be described again. Cylinder 301 is made of such a length that the maximum stroke which the piston on the upper end of piston rod 302 might carry out within the cylinder is longer than the maximum distance of the movement of the pivotal connection 331 of cylinder 301 on the upper arm 327. Consequently, if this gas spring is installed on the drawing table after the gas pressure in the gas spring has been properly adjusted in the manner as described with reference to FIGURES 1 to 3 so as to be in accordance with the weight of the drawing board 326 and the force which it exerts upon the connecting eye 331 on cylinder 301, the piston on the upper end of piston rod 302 will never reach at least the lower end of the cylinder and hit upon the strong coil spring 5, 105, or 205, as shown in FIGURES 1 to 3. An accidental compression of this coil spring which might lead to a reduction of the gas pressure in cylinder 201 is thus prevented. If the gas spring is of the type as shown either in FIGURE 2 or in FIGURE 3 and provided with an upper control valve 109 or 209 for increasing the pressure in cylinder 301 for compensating an additional weight, for example, that of a lamp which is to be mounted on the drawing board 326, it is also possible to prevent absolutely any engagement of the piston on piston rod 302 with the upper control valve 109 or 209 by providing a setting ring, not shown, on the outer part of piston rod 302 or of the corresponding piston rod 102 or 202 in FIGURES 2 or 3 which may be adjusted thereon so as to abut against the bottom end of the cylinder before the piston reaches the upper control valve 109 or 209. Of course, it is also possible to provide suitable stop means on the apparatus, for example, the drawing table, to which the gas spring is connected for limiting the extent of its movements so as to prevent the gas spring after being properly adjusted from being erroneously readjusted by an accidental actuation of one of its valves. In the event that the weight of the drawing board 326 is to be increased or reduced, for example, by the installation of a lamp thereon or its removal therefrom, the gas spring may be readjusted in the manner as described with reference to FIGURES 1 to 3, after one of the connecting eyes 331 or 332 has been disconnected from the arm 327 or the base 325 of frame 324, respectively.

Although a single adjustable gas spring according to the invention which is connected to the arm 327 on only one side of the drawing board 326 may suffice for properly compensating its weight at any level thereof, it is, of course, more advisable to provide one of such gas springs on each side of the drawing board. For reducing the cost of the entire drawing table, it is, however, also possible to provide an adjustable gas spring only on one side of the drawing board and a nonadjustable gas spring on the other side. The cylinder of this nonadjustable gas spring would then be filled with a pressure gas which has an average pressure which might be required or a pressure slightly lower than such average pressure.

The adjustable gas spring according to any of the embodiments of the invention as previously described is of a very simple and inexpensive construction, very reliable in operation, and occupies very little space. Whichever of the different embodiments of the gas spring according to FIGURES 1 to 3 should be employed depends upon the particular requirements of the apparatus to which it is to be connected.

Although my invention has been illustrated and described with reference to the preferred embodiments thereof, I wish to have it understood that it is in no way limited to the details of such embodiments but is capable of numerous modifications.

Having thus fully disclosed my invention, what I claim is:

1. An adjustable gas spring comprising, in combination:
   (a) a cylinder having an axis and first and second end walls axially bounding a cavity in said cylinder;
   (b) a piston axially dividing said cavity into a first chamber adjacent said first end wall and a second chamber adjacent said second end wall;
   (c) a piston rod fixedly fastened to said piston and extending therefrom through said first chamber and through said first end wall into the ambient atmosphere,
      (1) said piston and said piston rod being formed with a throttling channel having a first orifice in said piston rod and a second orifice in said piston,
      (2) said piston being axially movable in said cavity between a plurality of normal operating positions in which said first orifice is located in said first chamber and a bleeding position in which said first orifice is outside said cavity and communicates with said atmosphere,
      (3) said second orifice communicating with said second chamber in said operating positions and in said bleeding position of said piston; and
   (d) compression spring means axially interposed in said first chamber between said piston and said first end wall for impeding movement of said piston rod into said bleeding position.

2. A gas spring as set forth in claim 1, further comprising a gas under a pressure higher than atmospheric pressure substantially filling said chambers and said channel, said second end wall being imperforate.

3. A drawing table comprising a frame, a drawing board mounted on said frame for movement in a vertically extending direction, and a gas spring as set forth in claim 2 connecting said frame to said drawing board for resiliently resisting downward movement of the drawing board.

4. A gas spring as set forth in claim 1, wherein the axial length of said compression spring means in the relaxed condition thereof is smaller than the axial spacing of said piston and said first end wall when said piston moves between said normal operating positions, and said axial length is greater than the axial spacing of said piston and said first end wall when said piston is in said bleeding position, said compression spring means abuttingly engaging said piston and said end wall in said bleeding position of said piston, said end wall being fixed.

5. A gas spring as set forth in claim 4, wherein said piston has respective faces in said first and second chambers, the effective area of the face of said piston in said second chamber being greater than the effective area of the face of said piston in said first chamber.

6. An adjustable gas spring comprising, in combination:
   (a) a cylinder having an axis and first and second end walls axially bounding a cavity in said cylinder, said cavity being adapted to contain a gas under pressure;
   (b) a piston axially dividing said cavity into a first chamber adjacent said first end wall and a second chamber adjacent said second end wall;
   (c) a piston rod axially dividing said cavity into a first chamber adjacent said first end wall and a second chamber adjacent said second end wall, said chambers normally communicating with each other through a throttling channel in said piston;
   (d) a gas under a pressure higher than atmospheric pressure substantially filling said chambers and said channel; and
   (e) adjusting means for varying the pressure of said gas, said adjusting means including
      (1) a storage chamber adapted to contan a gas under a pressure higher than the pressure of said gas in said first and second chambers, said second end wall separating said second chamber from said storage chamber and being formed with a bore,
      (2) a check valve in said bore normally closed by the gas pressure in the storage chamber, and
      (3) abutment means on said check valve and extending into said second chamber for engagement by said piston.

7. An adjustable gas spring as set forth in claim 6, wherein said channel extends through said piston and an adjacent part of said piston rod, and has a first orifice on said piston rod spaced from said piston a distance exceeding the thickness of said first end wall sufficient to permit escape of gas from said second chamber through said channel to the atmosphere, when said piston approaches said first end wall, the channel having a second orifice normally communicating with said second chamber, said check valve sealingly engaging said second orifice when said abutment means are engaged by said piston.

8. A drawing table comprising a frame, a drawing board mounted on said frame for movement in a vertically extending direction, and a gas spring as set forth in claim 7 connecting said frame to said drawing board for resiliently resisting downward movement of the drawing board.

9. An adjustable gas spring as defined in claim 6, in which said check valve comprises a valve stem slidable in said bore and having a flange on one end normally adapted to engage upon said second end wall within said storage chamber and having a length exceeding the thickness of said second end wall so that its other end normally projects into said second chamber to constitute said abutment means, said valve stem further having an axial groove in its outer surface near said other end, said groove having a length exceeding the thickness of said second end wall so that, when said piston is moved temporarily by said piston rod more closely toward said second end wall than during normal operation of said gas spring, it will push the projecting end of said valve stem toward said second end wall to a position in which the ends of said groove terminate in said second chamber and said storage chamber so that gas can flow from said storage chamber through said groove into said second chamber and increase the pressure therein.

10. An adjustable gas spring comprising a closed cylinder adapted to contain a pressure gas and having opposite first and second end walls, a piston rod extending from the outside through a bore in said first end wall into said cylinder and sealed tightly relative to the wall of said bore, a piston secured to one end of said piston rod and slidable in said cylinder and dividing the same into a first and a second working chamber adjacent said first and second end walls, respectively, a throttling channel connecting said chambers to each other, and adjusting means for varying the pressure of said gas in said cylinder, said channel extending through said piston, said adjusting means comprising a storage chamber adapted to contain a high-pressure gas and extending co-axially to said cylinder and having a part surrounding said cylinder and another part adjacent to said second end wall, said second end wall having a bore, a check valve slidable in said bore and normally adapted to be closed under pressure of said high-pressure gas and to be temporarily opened by said piston for passing a part of said high-pressure gas from said storage chamber into said second chamber so as to increase the pressure therein when said piston is moved by said piston rod into engagement with said check valve and thereby more closely toward said second end wall than during normal operation of said gas spring, said check valve being adapted to close said channel when said piston is moved into engagement with said check valve so as to prevent said pressure gas from flowing from said second chamber into said first chamber, said adjusting means further comprising a device for reducing the pressure of said pressure gas in said cylinder, said device comprising a strong coil spring in said first chamber and having one end resting on said first end wall, a sealing member on the other end of said coil spring, said coil spring together with said sealing member having such a maximum length that said piston will not engage with said sealing member when carrying out its maximum stroke during said normal operation of said gas spring and a second check valve being disposed at a point near said first end wall and normally closed by the pressure in said storage chamber and when opened connecting said first chamber with said storage chamber, said piston being adapted first to engage with said sealing member so as to close said channel when said piston is moved by said piston rod more closely toward said first end wall than during said normal operation of said gas spring, said piston when further moved toward said first end wall pumping the pressure gas, which has passed from said second chamber through said channel into said first chamber before said channel is closed by said sealing member, from said first chamber through said second check valve into said storage chamber.

11. A drawing table comprising a frame, a drawing board mounted on said frame for movement in a vertically extending direction, and a gas spring as set forth in claim 10 connecting said frame to said drawing board for resiliently resisting downward movement of the drawing board.

References Cited

UNITED STATES PATENTS

| | | | |
|---|---|---|---|
| 1,327,956 | 1/1920 | Koechlin | 108—2 |
| 2,714,001 | 7/1955 | Hersey et al. | 108—136 X |
| 3,147,967 | 9/1964 | Bougeard | 267—65 |
| 3,272,495 | 9/1966 | Axthammer | 267—64 |

ARTHUR L. LA POINT, *Primary Examiner.*

HOWARD BETRAN, *Assistant Examiner.*

U.S. Cl. X.R.

108—2; 267—1, 34, 64, 65